United States Patent Office 3,560,427
Patented Feb. 2, 1971

3,560,427
**METHOD FOR CONSOLIDATING
A PERMEABLE MASS**
Cornelis Bezemer, Franciscus H. Meijs, and Marinus van Zanten, Rijswijk, Netherlands, and Clifford V. Wittenwyler, Union, N.J., assignors to Shell Oil Company, New York, N.Y.
No Drawing. Division of application Ser. No. 690,400, Dec. 14, 1967, now Patent No. 3,476,189, which is a continuation-in-part of application Ser. No. 422,515, Mar. 24, 1965, now Patent No. 3,368,262. This application June 2, 1969, Ser. No. 829,728
Claims priority, application Great Britain, Mar. 26, 1964, 12,985/64, 12,986/64
Int. Cl. C08g 51/34
U.S. Cl. 260—33.4                                                              4 Claims

ABSTRACT OF THE DISCLOSURE

A method of consolidating formations using a resin-forming composition and a silane bonding agent having in the molecule at least one R—COO— radical bonded directly or indirectly to a Si atom and wherein R is an unsaturated aliphatic hydrocarbon.

CROSS-REFERENCES TO RELATED APPLICATIONS

This application is a division of copending patent application Ser. No. 690,400, filed Dec. 14, 1967, now Pat. No. 3,476,189, which application is a continuation-in-part of patent application Ser. No. 422,515, filed Mar. 24, 1965, which matured as U.S. Pat. 3,368,262 on Feb. 13, 1968.

BACKGROUND OF THE INVENTION

This invention relates to a consolidating composition useful for consolidating permeable earthen materials and more particularly to the consolidation of subterranean earthen formations, especially those containing siliceous materials.

Various resin compositions have been used to consolidate permeable earthen materials which are either unconsolidated or partially consolidated. Such resin consolidations are often applied to loose subsurface formations surrounding piles and foundations of various structure. While resin consolidations, especially where the formation is completely saturated with the resin are excellent, the relatively high cost of the resins prohibits many such consolidations.

In other applications, where the formation to be consolidated must remain permeable, it is not possible to saturate the formation with resins since this would close off the pore space between the adjacent grains of the formations making the resulting consolidated formation completely impermeable. In order to maintain permeability and a corresponding reduction in cost, resins have been dispersed in formations in concentrations less than saturating to achieve some consolidation and at the same time maintain permeability. However, when the concentration of the resin is reduced, much of the resin merely collects and coagulates in the pore spaces between adjacent grains of the formation without adding appreciably to the actual consolidation or the compressive strength of the consolidated grains. Therefore, it has been a wide-spread practice to attempt a compromise between some consolidation and some permeability, when it is necessary that the formation consolidated remain permeable.

A typical situation where the consolidated formation must remain permeable are those involving the consolidation of reservoir formations surrounding oil producing boreholes. In these cases, the unconsolidated grains contiguous to the borehole must be consolidated into a permeable mass in order that fluids can pass through it and into the well bore. It is in these situations that the integrity of resin consolidations have long been sacrificed in order to maintain satisfactory permeability.

Poor consolidation of the loose grains surrounding oil-producing reservoirs will allow the loose grains to be entrained by the fluid passing into the well. When such a well is used for the production of effluents from such a subsurface formation, considerable damage can be done to the production equipment by the grains carried by the effluents to the wellhead. The coarser grains, which are not carried by the wellhead by the flow of the effluents, accumulating the producing section of the well, "sanding-up" the well and reducing the production rate. If the production rate becomes too low, the well has to be either abandoned or bailed out before additional production can be accomplished. In many cases, the sand grains will enter the well in such quantities that it is not possible to produce therefrom without consolidation of the reservoir contiguous to the well.

The desire to achieve economic production from wells which cannot be produced without consolidation, has led to the poor compromise mentioned above when using the resin compositions. In such situations, it is often the practice to reduce the resin content to the point that the consolidation is relatively poor, so that adequate permeability of the partially consolidated mass can be maintained.

The method of this invention seeks to avoid such compromises by the formation of a hardened resin film covering the surfaces of the loose grains and leaves the pores (interstitial voids) unencumbered by resin precipitation. In this manner, it is possible to achieve consolidations which are both strong and permeable, and which can be accomplished at a very reasonable expense. Surprisingly, the consolidations accomplished according to the practice of this invention, are nearly as strong as those consolidations in which the formation is actually saturated with the resin or resin composition. This means that excellent consolidations can be achieved at a very reasonable cost while maintaining a very high permeability, even when strength is very important. Often, in the practice of this invention, the permeability of the consolidated mass is approximately that of the unconsolidated mass which makes this method extremely desirable for the consolidation of oil-producing reservoirs where the high permeability is very important. It is obvious that the consolidation of a formation surrounding a production well must have appreciable permeability to oil, gas and water in order that these fluids can enter the well bore and be recovered from the subsurface formation.

While it has been the practice to treat permeable, unconsolidated or partially consolidated masses with injected resin compositions to obtain consolidated, the consolidation integrity has often been sacrificed for purposes of permeability. It has now been found that a considerable increase in consolidation integrity can be achieved by resin compositions when an unsaturated silane containing at least one R—COO— radical where R is an unsaturated aliphatic hydrocarbon present in the mass or formation to be consolidated. The unsaturated silanes (more fully described later) have at least one functional group which is capable of reacting with the grains of the formation and another function group which is capable of reacting with the resin-forming composition with which the consolidation is to be accomplished. Thus, this class of silanes ensures a connecting link between the resin and the grains of the formations and thereby ensures greater consolidation integrity. Also, the presence of these unsaturated silanes tend to prevent the resin from accumulating in the pore space between adjacent grains and cause the resin composition to adhere closely to the surface of the grains being consolidated. Under such circumstances, the resin does not coagulate in the pores and leaves the consolidated formation relatively permeable while also achieving high consolidation integrity.

Thus, the method of consolidating permeable unconsolidated or partially consolidated masses comprises injecting into the mass to be consolidated a solution of a resin-forming composition and an unsaturated silane having in the molecule at least one RCOO— radical bonded directly or indirectly to a Si atom wherein R is an unsaturated aliphatic hydrocarbon and the compound preferably also containing at least one alkoxy or aroxy radical. Silanes of this type can be represented by the general formula:

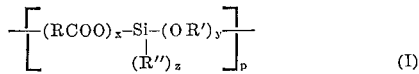

(I)

where R is an unsaturated aliphatic hydrocarbon generally having from 1–10 carbon atoms, R' and R'' can be the same or different saturated or unsaturated alkyl-aryl and/or cycloalkyl radicals, the same of $x$, $y$ and $z$ being 4 and $x$ can be 1 or 2, $y$ can be 2 or 3 and $z$ can be 0 or 1; $p$ can be 1 or a positive integer of from 2 to several thousands. When $p$ is greater than one the polysilane can be represented by the formulas:

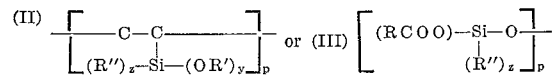

where $p$ is at least 2 and can be greater than 1000 and the symbols in (II) and (III) are the same as in (I).

Broadly, this method of consolidating permeable unconsolidated or partially consolidated masses comprises the following steps:

(a) The preparation of the solutions of a resin-forming composition and an unsaturated silane represented by Formulas I, II or III or mixtures thereof in suitable solvents;

(b) Injecting the resulting solutions into the permeable mass to be consolidated; and, (c) Retaining the solutions within the mass until a hard cross-linked resin has formed on the surfaces of the grains in the mass, thereby consolidating the same.

It should also be appreciated that the unsaturated silanes which are so necessary in the practice of this invention can be injected in a suitable solvent separate from the resin-forming composition, or alternatively be injected simultaneously with the resin-forming composition in the same solution. In fact, in some cases, it will be highly desirable to inject the silane compound in a separate solvent prior to the injection of the resin composition in another solvent because of the particular effluents which might be present in the pore space of the mass to be consolidated.

Silanes represented by the above formulas can be prepared by any suitable means and include the methods described in U.S. Pats. 3,159,662; 3,198,820 and 3,296,291 or by methods described in texts such as "Silicones" by S. Fordham or "Organosilicon Compounds," vol. I, by Bazant et al. Silane compounds which are useful in the process of consolidating formations by the process of the present invention are commercially available from Union Carbide Corporation under the designation of Silicon A–174 and has the formula

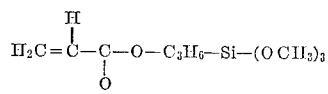

Other silane compounds include:

(A) 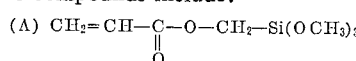

(B) 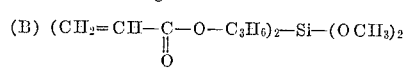

(C) $CH_2=CH-\underset{\underset{O}{\|}}{C}-O-C_3H_6-Si-(OC_2H_5)_3$ (D) $CH_2=\underset{CH_3}{\overset{|}{C}}-\underset{\underset{O}{\|}}{C}-O-C_3H_6-\underset{\underset{OH}{|}}{Si}-(OCH_3)_2$ (E) $CH_2=CH-\underset{\underset{O}{\|}}{C}-O-C_3H_6-\underset{\underset{O}{|}}{Si}-(OCH_3)_2$ (F) $CH_2=CH-(CH_2)_x-\underset{\underset{O}{\|}}{C}-O-\underset{\underset{CH_3}{|}}{Si}-(OCH_3)_2$ where $x=0-20$ (G)
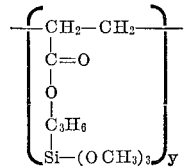

where $y=2-100$

The presence of even small amounts of such unsaturated silane compounds in the practice of this invention results in highly superior consolidation when compared with the older processes. It is generally preferred that these silane compounds be present in concentrations of 1% or less by volume of the solution which is used as a vehicle to introduce them into the mass to be consolidated. In fact, concentrations less than 1% by volume are extremely useful and a very satisfactory range is from 0.25% to 1% by volume of the solution used as the vehicle.

The resin-forming compositions useful in the practice of this invention are preferably epoxy resins and may be either an uncured resin or a partially cured resin with an appropriate curing agent. When the resin has been partially reacted with a curing agent, it is often referred to as a "B-stated" resin, and these types are useful in the practice of the invention. The preferred epoxy resins useful in the practice of the invention are the monomeric and/or polymeric organic polyepoxides having more than one epoxy group per molecule and which are capable of being cured to hardened resin compositions. Many such resins are available commercially.

When using the epoxy resins, the curing agent is not limited to any particular one. However, it is generally preferred to use the polyamine curing agents having at least 3 aminohydrogen atoms. These aminohydrogen atoms can be on several or more nitrogen atoms present in the curing agent molecule.

Alternatively, the resin-forming composition may consist of any adduct of an epoxy compound and a curing agent which has undergone a limited reaction but which will continue to cure under change of conditions. Examples of amino-curing agents are bis(3-methyl-4-aminophenyl)sulphone, 1 - cyclohexylamino-3-aminopropane and the like or mixtures thereof.

While the epoxy resins, such as the diglycidyl ether of bisphenol A having a molecular weight of about 340 (see U.S. Pat. 2,633,458, issued to Shokal), are the preferred resins and available commercially under the trade name "Epikote 828" sold by Shell, the invention is not restricted to epoxy resins. For example, various hydroxy-aryl/aldehyde resins can also be used; for example, phenol/formaldehyde resinous condensation products.

In using epoxy compounds, the solvent used as a vehicle to introduce such compounds and a curing agent (resin-forming composition) into the formation are different from those required when phenol/formaldehyde resins are used. Since the epoxy compounds are the preferred resins for the resin-forming composition, it will be discussed in greater detail. Usually, an excellent solvent for the epoxy resin-forming compositions are the alcohols, such as methanol, ethanol, isopropanol or mixtures of two or more of these alcohols. Also, aromatic hydrocarbons, such as benzene, and aromatic hydrocarbons mixed with other hydrocarbons are suitable solvents or vehicles for the practice of this invention if the aromatic content is at least 80% by volume.

For example, benzene, suitable derivatives thereof or aromatic hydrocarbons obtained by extraction of kerosene, gas oils, spindel oil or heavy cat-cracked cycle oils are all useful in the practice of the invention.

Preferably, the resin-forming composition consisting of the epoxy compound and amino-curing agent is dissolved in the solvent vehicle to give a solution having a concentration of resin-forming composition between 3 and 50% by volume of the resulting solution. Generally, when it is desirable to maintain high permeability of the mass consolidated, the resin-forming composition preferably constitutes from 3 to 15% by volume of the solution. The same percentages are also used in the preferred practice of the invention when using resins composed of hydroxyaryl/aldehydes as the resin-forming composition, but it is to be remembered that the solvent vehicle will be different in the latter case.

When hydroxyaryl/aldehyde is used as the resin-forming composition, the vehicle will actually be water but is not limited thereto. The distinction between the different solvents used, depending on which resin-forming composition to be employed, will be especially clear when considering the interstitial fluids in the formation. For example, if the interstitial voids of the formation contains only oil, it will be unnecessary to preflush the formation to remove the oil when using the epoxy compound. However, if there is a great deal of interstitial water, it may be necessary to remove the water with a suitable preflush or to avoid unwanted effects on the epoxy resin cure. Conversely, the presence of water when using the hydroxyaryl/aldehyde resins is acceptable but the presence of oil is undesirable.

The presence of interstitial substances (fluids) such as water and/or oil also tend to prevent the even distribution of the solutions used as vehicles to introduce the reactive consolidating substances into the formation. Of course, the lack of even distribution results in incomplete and poor consolidation. Thus, when such substances cannot be displaced from the formation's pore space by the solutions used as vehicles for injecting the unsaturated silane compound and/or the resin-forming compositions, they must be displaced by a preflush in order to obtain a thorough consolidation. Such a preflush may displace either the oil or the water, and in many instances both, from the pore space of the formation to be consolidated. Which must be displaced depends on whether an epoxy/ amino composition or a phenolic/aldehyde composition is to be used as the resin.

Displacements of undesirable fluids in the formation's pore space can be accomplished by a preflush with a solution which is capable of dissolving the undesirable fluid. Of course, the undesirable formation fluids may also be displaced by their emulsification and displaced by the injection of additional fluids.

In accomplishing preflushes of the formation, it should be appreciated that one or more of the active consolidating materials may be contained in the solution used as the preflush liquid which then, also functions as a solvent for the material. For example, if water and oil are both present in the pore space of the formation to be treated, no preflush is required if the solvent used as a vehicle for the resin-forming composition and the unsaturated silane compound is capable of dissolving both water and oil. Such a situation would exist if the solvent vehicle is an alcohol, such as isopropanol or methanol. However, if the solvent vehicle(s) for the consolidating materials will not dissolve the intersititial aqueous fluid when using epoxy resins, it is necessary to use a preflush which will remove the equeous fluids.

While it is not necessary that the formation receive a preflush if the solvent vehicle is capable of removing both water and the oil from the pore space, it still may be desirable to use a preflush which can displace one or the other or both of these fluids from the pore space. The reason for such a preflush is that the leading part of the solvent vehicle(s) containing the reactive materials which are to be injected into the formation may be diluted by the interstitial fluids in the pore space and cause a poor consolidation.

Sometimes, it is desirable to use a spacer fluid between the solvent vehicle containing the consolidating materials and the preflush fluid. Preferably, the spacer fluid is soluble in the solvent vehicle for the consolidating materials and the preflush is soluble in the spacer fluid in order that maximum displacements can be accomplished. However, no spacer fluid is required if the solvent vehicle is the same or equivalent to the preflush liquid. For example, if alcohol is used as a preflush solution and also for the solvent vehicle of the epoxy resin composition, it would be unnecessary to use a spacer fluid between the alcohol preflush and the injection of the epoxy resin composition. Also, it should be appreciated that the unsaturated silane compound can be introduced in one solvent vehicle which also acts as a preflush and then followed by a resin-forming composition in a second solvent vehicle which is soluble in the first solvent vehicle. In this manner, a separate preflush may be avoided which would be the case if the alcohol preflush above also contained the unsaturated silane compound when the unsaturated silane compound and the resin-forming composition are introduced in separate solvents.

The rate at which the polymerization reaction occurs in the resin-forming composition is partially dependent on temperature and since it is important that the solvent vehicle containing the resin-forming composition be dispersed in the formation to be consolidated at the time the polymerization has taken place sufficiently to cause an intermediate resinous product to precipitate out of the solution, it is important to control the rate at which such an immediate resin product is formed. Generally, it is desirable to define the useful period of the resin-forming composition in its solvent vehicle as the period between its preparation and the moment at which the first droplets of the intermediate resinous product starts to separate from the solvent vehicle which will be indicated hereinafter by initial resin separation (I.R.S.) time. The control of the I.R.S. time is of particular necessity if the mass to be consolidated is an underground formation since it is necessary to have the solution of the resin-forming composition dispersed in the formation prior to the time the first droplets of the resinous products start to separate from the solution. Also, the period for the separation of the first droplets of the intermediate resinous product must not be so long as to allow the solution to become widely dispersed in the formation. Therefore, care must be taken to control the I.R.S. time so as to prevent premature formation of the droplets on the one hand, but avoid unnecessary dispersion by a long I.R.S. on the other hand.

To control the I.R.S., various agents may be added to the resin-forming composition, depending upon the particular type resin, for controlling the reaction rate in the composition. For example, when using epoxy-based, resin-forming compositions, a ketone, and in particularly acetone, can be added to the composition to control the I.R.S. time. Phenol can also be used in epoxy-based, resin-forming compositions if the solvent vehicle is an aromatic hydrocarbon, and water can be used if the solvent vehicle is alcohol. The amount of such controlling agents will be dependent upon the particular situation and preferably laboratory experiments are used to determine the most suitable I.R.S. time for a particular application.

When using the hydroxyaryl/aldehyde based resin-forming compositions in an aqueous solvent vehicle, alkaline compounds such as sodium or potassium hydroxides or carbonates will be used to control the I.R.S. time.

PREFERRED EMBODIMENTS OF THE INVENTION

In order to show the effectiveness of the present invention, a number of experiments have been carried out to determine the compressive strengths of a mass of sand treated according to the invention. In each of the experiments, the sand used was surface sand having a mean particle size of 0.1 millimeter to 0.14 millimeter. No liquid was present in the pore space of the mass of sand treated and the temperature in each case was approximately 80° C. to simulate reservoir conditions. Experiments were carried out with both the unsaturated silane compound and the resin-forming compositions in the same solvent vehicle, and other experiments introduced the unsaturated silane compound in a separate vehicle followed by the resin-composition in a second solvent vehicle.

EXAMPLE I

The following three representative solutions were prepared to demonstrate this invention and also the use of reaction-retarding agents such as acetone and promoters such as phenol on the initial resin separation time:

Solution A—
    Resin-forming composition:
        Epoxy compound: "Epikote" 828—12% vol.
        Curing agent: bis(3-methyl-4-aminocyclohexyl) methane—6% vol.
    Reaction retarder: acetone—10% vol.
    Promoter: phenol—2% vol.
    Unsaturated silane compound: Additive A-174—0.25% vol.
    Solvent: "Shellsol" N (Hydrocarbon solvent, at least 80% by volume aromatic content)—69.75% vol.
    I.R.S. time at 80° C.—175 min.

Solution B—
    Resin-forming composition:
        Epoxy compound: "Epikote" 828—13.5% vol.
        Curing agent: bis(4 - aminophenyl)methane—4.5% vol.
    Reaction retarder: acetone—20.0% vol.
    Unsaturated silane compound: Additive A-174—0.25% vol.
    Solvent: isopropylalcohol—61.75% vol.
    I.R.S. time at 80° C.—153 min.

Solution C—
    Resin-forming composition:
        Phenol—11.2 g.
        Formalin (containing 36% w. formaldehyde)—13.0 g.
    Reaction controller:
        Potassium hydroxide—0.15 g.
        Potassium carbonate—10.0 g.
    Unsaturated silane compound:
        Additive A-174—0.25 ml.
    Solvent for unsaturated silane compound:
        isopropyl alcohol—10.0 mil.
    Solvent: water, added to the above components in an amount to make up a total volume of 100 ml.
    I.R.S. time at 80° C.—203 min.

Similar solutions to A, B and C were prepared but without the unsaturated silane compounds. Thereafter, consolidations were accomplished with all the solutions A, B and C and were about 240–250 compressive strength in kg./cm.$^2$ whereas without the silane the compressive strength varied between 0 for solution C and about 200 for solution A without the silane (A–174). Flushing at 80° C. using gas, oil and water for about 3 days was used.

Dry sand packs were used and it was therefore necessary to determine the affects of the presence of interstitial oil and water in the pore space of the mass to be consolidated. In considering this problem, it is also necessary to consider the use of preflushes which are adapted to remove either oil or water or both from the pore space in the area of the formation in which consolidation is desired so that such interstitial fluids will not interfere with the consolidation.

In considering preflushes, it must be remembered that it is possible to make solutions, such as those described in Example I, which have a hydrocarbon solvent vehicle or have an aqueous solvent vehicle. Thus, if the pore space contains only water and no oil, it is possible to use those solutions which have an aqueous solvent vehicle without a preflush. Likewise, when the pore space contains only oil, hydrocarbon solvent vehicles can be used with the unsaturated compound and the resin-forming composition without the necessity of a preflush. However, if the pore space contains both oil and water, a preflush may be used since the presence of one or the other of these substances in the pore space would be detrimental to good consolidation.

In such cases, it is desirable to remove either the oil or the water, or for that matter, both, and then use, for example, one of the consolidating solutions as described in A, B and C in Example I. Fluids which will displace water or oil, or both, such as alcohol, are well known and within the knowledge of those skilled in the art. The important principle to remember is that the part of the formation to be consolidated must be free of the incompatible fluid in its pore space. Further, in certain circumstances, it may be desirable to use a spacer fluid between the consolidating solution(s) and the preflush. The use of such spacer fluids adds flexibility to the process and allows various preflushes to be adaptable to both aqueous and hydrocarbon based solutions of consolidating compositions. Also, when using preflushes, it is acceptable to use well-known surface active agents to aid in the displacement of either the interstitial water and/or oil. Surfactants which are preferred have the formula R—NH—(CH$_2$)$_3$—NH$_2$ wherein R is an alkyl selected and derived from the group consisting of coconut oil, soya oil and tallow. Excellent organic substances used as preflushes are those having less than 6 carbon atoms and containing keto and/or hydroxyl groups such as alcohols and ketones. Specifically, methanol, ethanol, isopropanol and acetone are excellent preflush liquids.

In order to more dramatically illustrate the effect of the use of preflush, three sand packs were prepared and flushed with both brine and oil to ensure that their pore space contained both water and oil. These sand packs, which were made identical as possible, were treated by three solutions; one containing no unsaturated silane compound, the other being the same, but containing an unsaturated silane compound (A–174) in an amount of 0.25% by volume and the third solution exactly the same as the second except alcohol preflush was used in combination with it.

Specifically, the sand packs were made of dry sand having a mean particle size of 0.14 millimeter and were packed in the three tubes having an internal diameter of 3.7 centimeters and a length of 17 centimeters. Thereafter, each sand pack was saturated with a 5% aqueous solution of sodium chloride. The pore space of each pack was then flushed with crude oil to a residual brine saturation in order to achieve a sand pack which simulated underground reservoir formations.

In the first test, the tube sand pack was preflushed by a volume of brine containing 5% sodium chloride in a volume which was twice the volume of the pore space. Thereafter, an equal volume of the solution C, described in Example I, but minus the unsaturated silane compound, was injected into the pore space of the sand pack and retained therein until the resin-forming components had reacted.

In the second test, the tube sand pack was likewise flushed with 5% aqueous solution of sodium chloride and then the same volume of solution C but with the unsaturated silane compound included therein was injected into the sand pack and remained until the reaction was completed.

In the third test, the tube sand pack was preflushed with isopropylalcohol in an amount equal to twice the volume of the pore space of the pack and thereafter the same solution C as used in the second test was injected into the sand pack and retained therein until it had reacted.

Thereafter, the three sand packs were measured for compressive strength in kilograms/square centimeter at a temperature of 80° C. after one week of water flushing. The compressive failing points of the three sand packs were noted to be as follows: (1) 0 kg./cm.$^2$, (2) 20 kg./cm.$^2$ and (3) 130 kg./cm.$^2$ compressive strengths, respectively.

Comparing the results of the three test sand packs above, it can be seen that the presence of the unsaturated silane compound is indeed important and that the use of a proper preflush can dramatically improve the compressive strength of the sand pack.

In the above examples, the situations discussed were those in which the unsaturated silane compound and the resin-forming compositions were both mixed in one solvent vehicle. It is to be appreciated that the unsaturated silane compound need not be in the same solvent as the resin-forming composition and can be injected into the formation ahead of the resin-forming composition in the separate solvent vehicle. Further, if the unsaturated silane compound is introduced into the mass to be consolidated in a separate solvent, it may act very similar to a spacer fluid and/or actually be equivalent to a preflush of the formation, depending upon the particular solvent vehicle used. Further, since the presence of an unsaturated silane compound in the solvent vehicle along with the resin-forming composition has little effect upon the initial resin separation time (I.R.S.), the discussion as to the use of promoters and retarders apply equally to the situations in which the two are introduced into the formation in separate solvent vehicles and will not be repeated here.

The following "two solvent" consolidation solutions are set forth as typical of those that would be useful in consolidations when injecting the unsaturated silane compound in one solution and the resin-forming composition in another.

Solutions I—
    First slug:
        First solvent—isopropyl alcohol
        Unsaturated silane compound—additive A–174
    Second slug:
        Spacer—aromatic hydrocarbon, benzene
        Second solvent—aromatic hydrocarbon, benzene
        Resin-forming composition: epoxy compound, such as, "Epikote" 828 and bis(3-methyl-4-aminocyclohexyl)methane Solutions II—
    First slug:
        First solvent—water
        Unsaturated silane compound—additive A–174
    Second slug:
        Spacer liquid—isopropyl alcohol
        Second solvent—water
        Resin-forming composition: phenol/formaldehyde resin Solutions III—
    First slug:
        Preflush liquid—ethanol
        First solvent—water
        Unsaturated silane compound—additive A–174
    Second slug:
        Second solvent—water
        Resin-forming composition—phenol/formaldehyde resin It should be appreciated that the above solutions I—III are merely exemplary of those which could be used in a consolidation of a loose mass and that the specific materials used could be replaced by suitable alternatives without departure from the spirit of the invention.

When using the separate solvent vehicles, as the first and second slugs, to introduce the unsaturated silane compound and resin-forming compositions, respectively in that order, care should be taken that the first solvent vehicle has the capacity of displacing the undesirable fluids from the formation. Also, it is important that the second slug containing the resin-forming composition be able to displace the first slug from the formation and either the first or second slug should have a capacity for displacing any remaining undesirable fluid from the pore space of the mass to be consolidated. Naturally, a suitable preflush can be used before either slug is injected if the first and second slugs do not have the above capacities. Of course, it is also important to make sure that the slugs used do not contain large amounts of foreign matter and/or precipitates which will plaster out as the slugs are being injected into the mass as this will cause poor distribution and bad consolidation. The required quantities of the unsaturated silane compound and the resin-forming composition which are dissolved in the first and second slugs, respectively, are the same as those used when both are introduced in the same solvent vehicle which has been discussed. In the practice of the invention, the first slug containing the unsaturated silane compound is pumped into the mass first and is followed by the second slug containing the resin-forming composition. If a preflush is used, this liquid is injected prior to the injection of the first slug and if a spacer liquid is applied, it is generally injected directly after the first slug and prior to the second slug. In most cases, the quantities of all the slugs will be generally equal in volume and also at least equal to the volume of the pore space volume of the mass to be consolidated.

As the first slug passes into the pore space of the mass to be consolidated, one functional group of the unsaturated silane compound reacts with the surfaces of the grains of the mass. Thereafter, as the second slug containing the resin-forming composition is injected, the unsaturated silane compound remains associated wtih the grains and is not displaced from the area to be consolidated. Once the second slug is injected, it is allowed to remain in the formation until the reaction is completed during which time the other functional group of the unsaturated silane compound will react with part of the resin-forming composition.

In the use of the invention in producing oil wells having unconsolidated sand reservoirs, it is important that the formation temperature and injectivity be measured as well as the determination of the water and oil saturation through the use of core samples. Using this information, it is possible, through the use of laboratory test results, to determine the required percentage of reagent in the first and second slugs, the preferred amounts of the unsaturated silane compound and resin-forming composition, and suitable preflush and spacer liquids which will be used in the consolidation. This information, combined with the depth of the well and the rates at which various pumps can inject the respective slugs into the formation allows the determination of the amount of reaction controlling agent (promoter or retarder) which will be necessary for the proper I.R.S. Once the controlling factors have been determined, the first and second slugs are injected into the reservoir formation in that order. Of course, if the invention is practiced using only a single vehicle solvent for both the unsaturated silane compound and the resin-forming composition, it will be injected directly after the preflush or spacer fluid if these are used. In any case, care should be taken that the solvent vehicle containing the resin-forming composition is not allowed to remain in the borehole of the well since it will tend to form an impermeable resin sheet on the formation face which will prevent the passage of fluids in or out of the formation. Also, it is important that this solvent containing the resin-forming composition should not be driven too far into the formation since those parts of the formation directly contiguous to the borehole will not be consolidated in such a situation. Therefore, it is preferred that a driving medium is used directly behind the solution of the resin-forming composition which has a plastering agent (such as a mud slush) which will plaster out when the driving fluid reaches the formation face. This technique ensures that solvent vehicles containing the resin-forming composition will be in the proper location and not displaced too far into the formation from the formation face.

The use of the unsaturated silanes of this invention can be used successfully with the overflush process described in U.S. Pat. 3,339,633.

The following example is set forth as a nonlimiting illustration of the invention and was used in the field to consolidate "O₂" sand at 7480 feet which required consolidation because of the solids intrusion problem.

EXAMPLE

In a producing well at 7480 feet, an electric log revealed a poorly developed member in the center of a 4-foot perforated producing zone having 4 perforations per foot which indicated the presence of shale or shaley sand, not readily consolidated with known processes. This producing interval was isolated with appropriate packers and water was injected into the reservoir through the perforations at 2100 p.s.i.g. at the rate of one barrel/minute.

After the water wash, the following materials were sequentially injected:

(1) 756 gallons 50:50 blend Shell Cyclo Sol 73 and Dieseline 50. (Preflush.)
(2) 756 gallons isopropyl alcohol. (Preflush.)
(3) 504 gallons Dieseline 50. (Preflush.)
(4) 252 gallons mixture of 225 gallons Dieseline 50, 26 gallons ethylacetate, 1 gallon Additive A–174. (Spacer.)
(5) Resin solution (all ingredients premixed before pumping into well) composed of: (a) 121 gallons Shell Epon 828; (b) 24 gallons Shell curing agent Z; and (c) 108 gallons ethylacetate. (This solution separated from preflush and overflush by wiper plugs.)
(6) Overflushing liquid in two slugs (a) and (b): (a) 84 gallons Dieseline 50, 168 gallons Silver Shell 30 (motor oil), and 13 gallons ethylacetate, and (b) 252 gallons Dieseline 50 and 252 gallons Silver Shell 30 (motor oil).

All materials were pumped at a constant rate of 0.5 bbl./min. Pumping pressures were as follows—preflushes: 2400–2800 p.s.i.; resin solution: 2300–2500 p.s.i., and overflushes: 200–2400 p.s.i.

The well was shut-in four hours and diesel injected at a rate of 0.5 bbl./min. with a pressure of 2600 p.s.i. The pressure was raised to 3300 p.s.i. (about 0.9 bbl./min.) momentarily and it dropped suddenly to 3100 p.s.i. The rate was reduced to 0.5 bbl./min. and the required pump pressure was then 2300 p.s.i. indicating a slight fracture had occurred.

The well was cleaned out and placed on production. The fluid was swabbed to 2500 feet and the well began to flow. An estimated 1 barrel of sand was recovered during the swabbing operations. After recovering the injected liquids, the well tested at a rate of 187 bbl./day of oil, 0.1% water, no sand, GOR 732 cu. ft./bbl. with a 940 p.s.i. tubing pressure through a 10/64-inch choke.

The well was last reported to be producing 256 bbl./day of oil with no sand.

Legend

Shell Cyclo Sol 73—diesel fuel oil with approximately 60% aromatic content.
Shell Dieseline 50—diesel fuel oil.
Shell Epon® 828—Bisphenol A and epichlorohydrin alkaline condensation product (average molecular weight 380).
Shell Curing Agent Z—adduct of meta-phenylene and methylene dianiline with phenyl glycidyl ether.

Additive A–174—

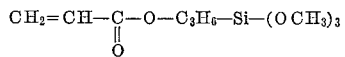

The unsaturated silanes are also particularly applicable in improving the process of consolidating formations by the method described in copending application Ser. No. 391,442, filed Aug. 24, 1964, wherein the unsaturated silane is preferably blended with the polyepoxide solution. Thus, where following this process the unsaturated silane such as Additive A–174 is blended with Composition A as described therein in amounts of from 0.25 to 10%. This modified Composition A (A′) is then blended with Compositions B and C as described therein and illustrated below and the total mixture injected into the formation to be consolidated. In referring to Compositions A′, B and C they are:

A′=a polyepoxy solution containing 0.25–10% unsaturated silane (A–174)
B=a curing agent solution in which the curing agent is a cycloaliphatic polyamine, e.g. (4,4′-diamino-3,3′-dimethyldicyclohexylmethane or 4,4′-diaminodicyclohexylmethane)
C=a curing accelerator in a solvent which can be phenols and alkyl substituted phenols The ratio of A′ to B can be 0.8–1.2:1.2:1 and preferably 1:1 and C is present in an amount of from 1–20% of the total amount of A′ and B.

It will be appreciated that the present invention is not limited to the specific examples set forth and that those skilled in the art can use the teaching of this invention for achieving desirable consolidations of masses located both above and below the ground. Emphasis has been given to the treatment of underground formations for which the process offers excellent strength while maintaining good permeability. Of course, it would be possible to use additional amounts of resin-forming composition in the solvent vehicle in order to completely plug the formation, if that is desirable. Such a situation might arise where it is desirable to shut off water ingress into a well bore during the drilling operations. In these situations, it can be appreciated that it is possible to achieve plugging and excellent consolidations with less resin than has been required in the past. In such situations, it is possible to first consolidate leaving the formation permeable and then plug it with more conventional, cheaper plugging agents such as gels.

What is claimed is:

1. A method for preparing a resinous reaction product for consolidating unconsolidated porous earth formations obtained by:

(a) blending (1) a resin-forming polyepoxide and (2) an unsaturated silane having the general formula

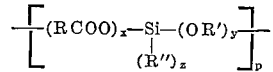

where R is an unsaturated aliphatic hydrocarbon generally having from 1–10 carbon atoms, R′ and R″ can be the same or different saturated or unsaturated alkylaryl and/or cycloalkyl radicals, the same of $x$, $y$ and $z$ being 4 and $x$ can be 1 or 2, $y$ can be 2 or 3 and $z$ can be 0 or 1; $p$ can be 1 or a positive integer of from 2 to several thousands, in a hydrocarbon solvent having an aromatic content of at least 80%;

(b) blending a cycloaliphatic polyamine with a hydrocarbon solvent having an aromatic content of from about 50% to about 75%;

(c) blending approximately equal volumes of blends (a) and (b);

(d) adding to (c) from 0 to about 7% of a solution of a phenolic compound as a promoter and an organic oxygen containing solvent in about equal proportions and, (e) reacting the total mixture until a resinous reaction product is formed.

2. A method for preparing a composition suitable for consolidating an unconsolidated porous earth formation obtained by:
(a) blending from (1) about 19% to about 29% by volume of a resin-forming polyepoxide produced by reacting epichlorohydrin with 2,2′-bis(4-hydroxyphenyl)propane, (2) about 0.25% to about 20% of an unsaturated silane having the general formula

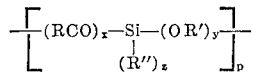

where R is an unsaturated aliphatic hydrocarbon generally having from 1–10 carbon atoms, R′ and R″ can be the same or different saturated or unsaturated alkylaryl and/or cycloalkyl radicals, the same of $x$, $y$ and $z$ being 4 and $x$ can be 1 or 2, $y$ can be 2 or 3 and $z$ can be 0 or 1; $p$ can be 1 or a positive integer of from 2 to several thousands, and (3) about 71% to about 81% by volume of a hydrocarbon solvent having an aromatic content above 80%;
(b) blending from about 9½% to about 14½% by volume of a cycloaliphatic polyamine with from about 85½% to about 90½% by volume of a hydrocarbon solvent having an aromatic content of from about 50% to about 75%;
(c) blending approximately equal volumes of the blends prepared in steps (a) and (b);
(d) adding to the composition prepared in step (c) from 0 to about 7% of a solution of about 50% by weight phenolic compound as a promoter and about 50% by weight of organic oxygen containing solvent; and,
(e) reacting the total mixture until a resinous product is formed.

3. A method of claim 2 wherein the unsaturated silane has the general formula selected from the group consisting of:

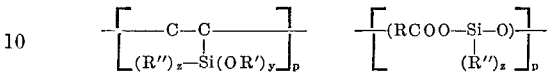

where $p$ is at least 2 and can be greater than 1000, and the symbols R″, R′, $z$ and $y$ are the same as in claim 2.

4. The method of claim 2 wherein the unsaturated silane is

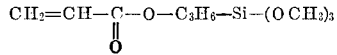

References Cited

UNITED STATES PATENTS

| | | | |
|---|---|---|---|
| 3,297,086 | 1/1967 | Spain et al. | 166—295 |
| 3,339,633 | 9/1967 | Richardson | 166—295 |
| 3,368,625 | 2/1968 | Wittenwyler | 166—295 |
| 3,476,189 | 11/1969 | Bezemer et al. | 166—295 |
| 3,150,116 | 9/1964 | Masters | 260—33.6(Ep)X |
| 3,380,941 | 4/1968 | Dittman et al. | 260—824X |

MORRIS LIEBMAN, Primary Examiner

L. T. JACOBS, Assistant Examiner

U.S. Cl. X.R.

260—33.6